(12) United States Patent
Kojima (10) Patent No.: US 9,933,038 B2
(45) Date of Patent: Apr. 3, 2018

(54) ANTI-VIBRATION DEVICE

(71) Applicant: BRIDGESTONE CORPORATION, Chuo-ku, Tokyo (JP)

(72) Inventor: Hiroshi Kojima, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/115,347

(22) PCT Filed: Apr. 27, 2015

(86) PCT No.: PCT/JP2015/002266
§ 371 (c)(1),
(2) Date: Jul. 29, 2016

(87) PCT Pub. No.: WO2015/170463
PCT Pub. Date: Nov. 12, 2015

(65) Prior Publication Data
US 2017/0067529 A1  Mar. 9, 2017

(30) Foreign Application Priority Data

May 7, 2014  (JP) ................................ 2014-095830

(51) Int. Cl.
*F16F 13/04* (2006.01)
*F16F 13/10* (2006.01)
(Continued)

(52) U.S. Cl.
CPC ............ *F16F 13/10* (2013.01); *B60K 5/1208* (2013.01); *F16F 13/14* (2013.01); *F16F 13/1409* (2013.01); *F16F 13/26* (2013.01)

(58) Field of Classification Search
CPC .......... F16F 13/105; F16F 13/08; F16F 13/10; F16F 13/101; F16F 13/102; F16F 13/106;
(Continued)

(56) References Cited

U.S. PATENT DOCUMENTS 6,341,766 B1 * 1/2002 Stiller .................. F16F 13/105
267/140.13
7,866,639 B2 * 1/2011 Endo ...................... F16F 13/14
267/140.12
(Continued)

FOREIGN PATENT DOCUMENTS

CN 102472354 A 5/2012
CN 203130894 U 8/2013
(Continued)

*Primary Examiner* — Bradley T King
*Assistant Examiner* — Stephen M Bowes
(74) *Attorney, Agent, or Firm* — Kenja IP Law PC (57) ABSTRACT

An anti-vibration device has excellent durability while reducing the amount of elastic deformation of an elastic body to a desired value. The disclosed anti-vibration device (1) includes an inner member (2), an outer member (3), an elastic body (4) that allows relative displacement between the inner member (2) and the outer member (3), a pair of first fluid chambers ($C_1$) in communication with each other via first restricting passages ($r_1$), and a second fluid chamber ($C_2$) in communication with an auxiliary fluid chamber ($C_3$) via a second restricting passage ($r_2$). The first fluid chambers ($C_1$) are disposed at opposite sides of the inner member (2). The second fluid chamber ($C_2$) is disposed in an orthogonal direction (Z) that is orthogonal to a sandwiching direction (Y) and to a direction along the axis (O) of the inner member (2). Stopper parts (S) are provided in the first fluid chambers ($C_1$).

10 Claims, 5 Drawing Sheets

(51) Int. Cl.
   *F16F 13/14*  (2006.01)
   *F16F 13/26*  (2006.01)
   *B60K 5/12*   (2006.01)

(58) Field of Classification Search
   CPC .... F16F 13/107; F16F 13/108; F16F 13/1409;
         F16F 13/1418; F16F 13/1463; F16F
         13/1481; F16F 13/24; F16F 13/1427
   USPC ................................... 267/140.13
   See application file for complete search history.

(56) References Cited

U.S. PATENT DOCUMENTS

| | | | |
|---|---|---|---|
| 8,191,876 B2* | 6/2012 | Kanaya | F16F 13/107 |
| | | | 267/140.13 |
| 2006/0043657 A1* | 3/2006 | Tanaka | F16F 13/10 |
| | | | 267/140.11 |
| 2013/0161883 A1* | 6/2013 | Nishi | F16F 13/101 |
| | | | 267/140.13 |
| 2014/0159290 A1* | 6/2014 | Kojima | F16F 13/08 |
| | | | 267/140.13 |

FOREIGN PATENT DOCUMENTS

| | | |
|---|---|---|
| CN | 103703271 A | 4/2014 |
| EP | 1672242 A1 | 6/2006 |
| EP | 2733381 A1 | 5/2014 |
| JP | H10252811 A | 9/1998 |
| JP | 2000081078 A | 3/2000 |
| JP | 2006170447 A | 6/2006 |
| JP | 2010159873 A | 7/2010 |
| JP | 2014031843 A | 2/2014 |
| WO | 2013011976 A1 | 1/2013 |

* cited by examiner

ANTI-VIBRATION DEVICE

TECHNICAL FIELD

This disclosure relates to an anti-vibration device.

BACKGROUND

An example of a conventional anti-vibration device includes a pair of first pressure-absorbing fluid chambers, the walls of which are formed by a portion of an elastic body provided between an inner cylinder and an outer cylinder, disposed to communicate with each other through first restricting passages and to sandwich the inner cylinder. The anti-vibration device also includes a second pressure-absorbing fluid chamber, the walls of which are formed by a portion of the elastic body, that communicates through a second restricting passage with an auxiliary fluid chamber filled with fluid (for example, see WO 2013/011976 (PTL 1)). This anti-vibration device further includes a stopper part continuing from a main wall part of the elastic body, that restricts the relative displacement of the inner cylinder and the outer cylinder. This stopper part is disposed on the outside of the elastic body.

CITATION LIST

Patent Literature

PTL 1: WO 2013/011976

SUMMARY

Technical Problem

The stopper part in PTL 1 prevents an excessive relative displacement in one direction (sandwiching direction) while also preventing an excessive relative displacement in another direction (orthogonal direction). This structure is advantageous in that the stopper part easily allows the pressure-absorbing fluid chambers to expand or contract while reducing the amount of elastic deformation of the elastic body and reduces the load on the elastic body, thereby making it easy to maintain the performance of the elastic body for an extended period of time.

On the other hand, when the anti-vibration device is used by attaching the inner cylinder to a member with a large variation in input of force, such as an engine, then since the stopper part is on the outside of the elastic body, the stopper part contacts the main wall part of the elastic body that forms the dividing walls of the first pressure-absorbing fluid chambers, which may cause durability to degrade.

It would therefore be helpful to provide an anti-vibration device that has excellent durability while reducing the amount of elastic deformation of the elastic body.

Solution to Problem

An anti-vibration device according to this disclosure includes:

an inner attachment member that is to be connected to one of a vibration generating portion and a vibration receiving portion;

an outer attachment member that surrounds the inner attachment member around an axis of the inner attachment member and is to be connected to the other one of the vibration generating portion and the vibration receiving portion;

an elastic body that is disposed between the inner attachment member and the outer attachment member and allows relative displacement between the inner attachment member and the outer attachment member by elastic deformation;

a pair of first pressure-absorbing fluid chambers, at least a portion of walls thereof being formed by the elastic body, that are in communication with each other via a first restricting passage and are filled with a fluid; and a second pressure-absorbing fluid chamber, at least a portion of walls thereof being formed by the elastic body, that is in communication with a fluid-filled auxiliary fluid chamber via a second restricting passage and is filled with a fluid, such that the first pressure-absorbing fluid chambers are disposed at opposite sides of the inner attachment member, the second pressure-absorbing fluid chamber is aligned with the inner attachment member in an orthogonal direction that is orthogonal to a sandwiching direction in which the first pressure-absorbing fluid chambers are disposed so as to sandwich the inner attachment member and to a direction along the axis of the inner attachment member, and a stopper part that functions upon a load being input in the sandwiching direction is provided inside at least one of the pair of first pressure-absorbing fluid chambers.

Advantageous Effect

According to this disclosure, an anti-vibration device that has excellent durability while reducing the amount of elastic deformation of the elastic body can be provided.

DETAILED DESCRIPTION

With reference to the drawings, an engine mount that is an embodiment of an anti-vibration device according to this disclosure is described in detail below. In the following description, the vertical directions of the drawing sheets are defined as perpendicular directions.

Figure 1:
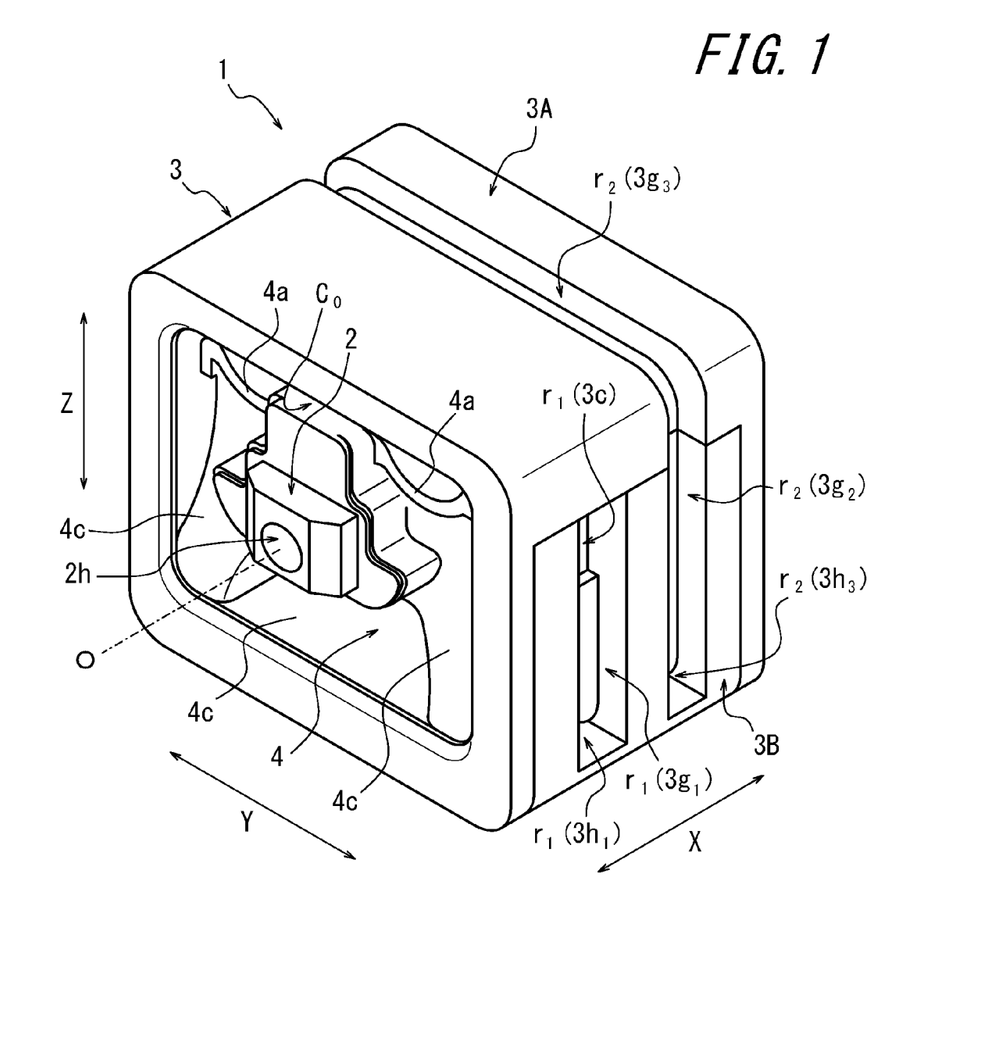
FIG. 1 is a perspective view schematically illustrating an engine mount, which is one embodiment of an anti-vibration device according to this disclosure.

In FIG. 1, reference numeral 1 indicates an engine mount disposed between an engine and a chassis (vehicle body). The engine mount 1 of this embodiment is, for example, a so-called fluid-filled anti-vibration device that is filled with a fluid such as ethylene glycol, water, or cylinder oil.

Reference numeral 2 indicates an inner attachment member that is to be connected to one of a vibration generating portion and a vibration receiving portion. The inner attachment member 2 is, for example, a metal member. In this embodiment, a through-hole 2h extending in the direction of the axis O of the inner attachment member 2 is formed in the inner attachment member 2. The inner attachment member 2 in this embodiment is to be connected to one of the vibration generating portion and the vibration receiving portion via an insertion member (not illustrated), such as a shaft, that is inserted through the through-hole 2h. Although the inner attachment member 2 in this embodiment is a hollow tubular member in which the through-hole 2h is formed, the inner attachment member 2 is not limited to being a hollow tubular member. For example, the inner attachment member 2 may be a solid member in which a through-hole is not formed. In the description below, a direction parallel to the axis O of the inner attachment member 2 is referred to simply as the "axial direction X".

Figure 2:
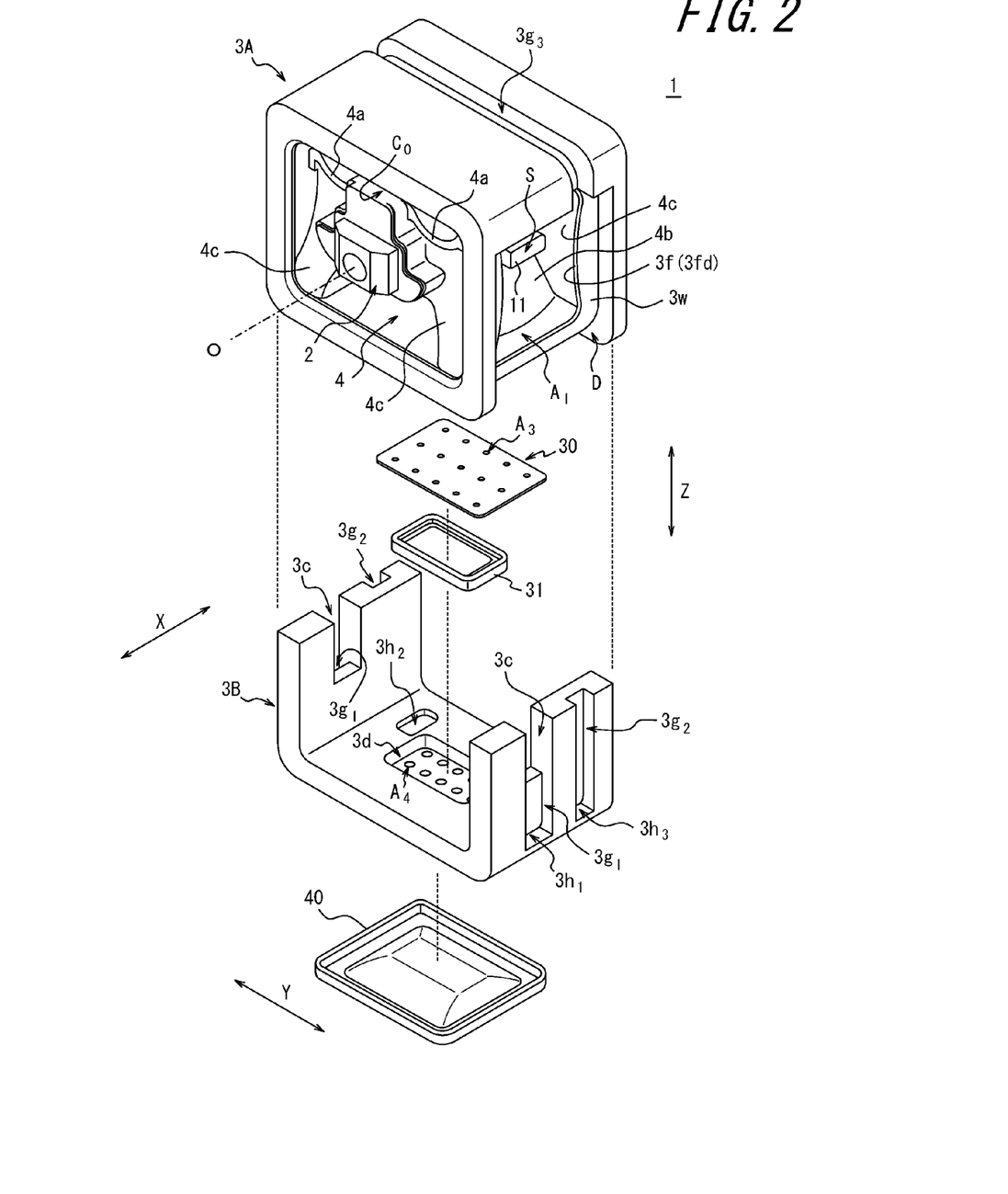
FIG. 2 is an exploded perspective view illustrating the engine mount in FIG. 1.

Reference numeral 3 indicates an outer attachment member that is to be connected to the other one of the vibration generating portion and the vibration receiving portion. The outer attachment member 3 is a tubular member that surrounds the inner attachment member 2 around the axis O thereof. In this embodiment, the outer attachment member 3 is to be connected to the other one of the vibration generating portion and the vibration receiving portion via a bracket member (not illustrated) into which the outer attachment member 3 is fit. In this embodiment, the outer attachment member 3 is formed by a body 3A and an attachment portion 3B. As illustrated in FIG. 2, in this embodiment, a recess D is formed by hollowing out a portion of the outer surface of the body 3A around the axis O in nearly a U-shape. The outer attachment member 3 is formed by securing the attachment portion 3B, which similarly is nearly U-shaped, to the recess D as illustrated in FIG. 1.

Figure 3:
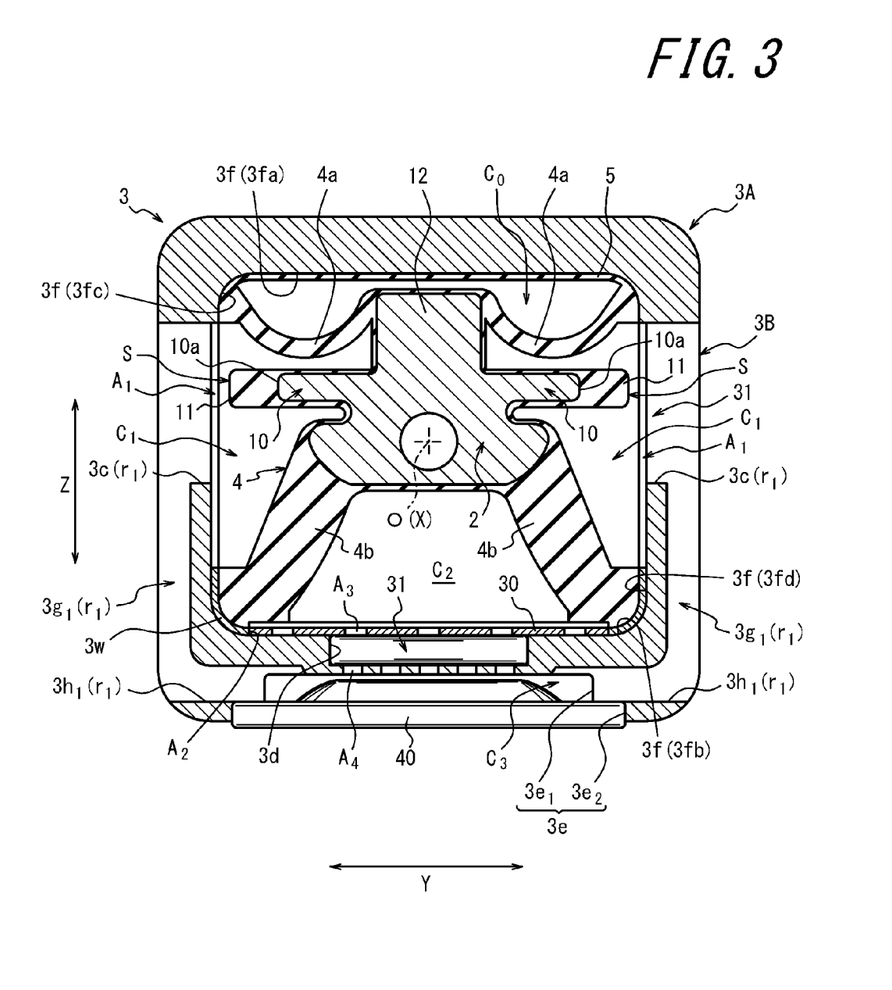
FIG. 3 is a cross-sectional diagram of the engine mount in FIG. 1 along the first restricting passages, illustrating a plane that includes the sandwiching direction and the orthogonal direction.

In this embodiment, the outer attachment member 3 has the appearance of a hollow prism, as illustrated in FIG. 1. An inner peripheral surface 3f that can house the inner attachment member 2 around the axis O is formed on the inside of the outer attachment member 3 (in this embodiment, the body 3A), as illustrated in FIG. 3. In this embodiment, the inner peripheral surface 3f of the outer attachment member 3 is formed by four planes 3fa to 3fd disposed so as to surround the axis O. Furthermore, in this embodiment, one set of planes 3fa and 3fb that face each other are nearly rectangular planes with long sides, whereas the other set of planes 3fc and 3fd that face each other are nearly rectangular planes with short sides that are shorter than the planes 3fa and 3fb. As a result, the inner peripheral surface 3f of the outer attachment member 3 (body 3A) is formed so that a cross-sectional shape thereof in a direction orthogonal to the axial direction X (also referred to below as the "axial cross-section") has a nearly rectangular shape, as illustrated in FIG. 3.

Reference numeral 4 indicates an elastic body that is disposed between the inner attachment member 2 and the outer attachment member 3 and allows relative displacement between the inner attachment member 2 and the outer attachment member 3 by elastic deformation. The elastic body 4 is an elastic member, such as rubber, that can deform and revert to its original state. In this embodiment, the elastic body 4 includes first partitions 4a and second partitions 4b that divide the space formed inside the outer attachment member 3 into four parts, as described below.

In this embodiment, as illustrated in FIG. 2, the first partitions 4a extend in the direction of the axis O from the upper portion of the inner attachment member 2 and towards the planes 3fc and 3fd on the short sides of the outer attachment member 3. In this way, as illustrated in FIG. 3, along with the inner attachment member 2, the first partitions 4a divide the space inside the outer attachment member 3 into two spaces: a space $C_0$ on the plane 3fa side, and a below-described space on the plane 3fb side further divided into four spaces. In this embodiment, the first partitions 4a are formed integrally with a cylinder rubber 5 that covers the plane 3fa of the outer attachment member 3, but the cylinder rubber 5 may be omitted.

As illustrated in FIG. 2, in this embodiment, the second partitions 4b are formed by a portion extending in the direction of the axis O from the lower portion of the inner attachment member 2 and towards the plane 3fb while extending towards the plane 3fc of the outer attachment member 3 (omitted from FIG. 2) and a portion extending in the direction of the axis O from the lower portion of the inner attachment member 2 and towards the plane 3fb while extending towards the plane 3fd of the outer attachment member 3. As illustrated in FIG. 3, the two second partitions 4b divide the space that is formed by the first partitions 4a, the inner attachment member 2, and the plane 3fb, plane 3fc, and plane 3fd of the outer attachment member 3 into three spaces: a space $C_1$ on the plane 3fc side and a space $C_1$ on the plane 3fd side, and a space $C_2$ on the plane 3fb side of the outer attachment member 3.

Furthermore, the elastic body 4 includes third partitions 4c at the end openings formed in the axial direction X of the outer attachment member 3, as illustrated in FIG. 2. The third partitions 4c are integrally connected to the first partitions 4a and the second partitions 4b and enclose a portion of the end openings so that a space $C_0$ at the plane 3fa side of the outer attachment member 3 becomes a through-hole extending along the axial direction X. In other words, in this embodiment, the elastic body 4 elastically holds the inner attachment member 2 against the outer attachment member 3 via the first partitions 4a, the second partitions 4b, and the third partitions 4c.

The three spaces $C_1$, $C_1$, and $C_2$ are each filled with a fluid, and as illustrated in FIG. 3, the two spaces $C_1$ that are partitioned on the inside of the outer attachment member 3 constitute the pair of first pressure-absorbing fluid chambers that can expand and contract (also referred to below as "first pressure-absorbing fluid chambers $C_1$"), at least a portion of the walls of which are formed by the elastic body 4. The space $C_2$ partitioned on the inside of the outer attachment member 3 constitutes the second pressure-absorbing fluid chamber that can expand and contract (also referred to below as "second pressure-absorbing fluid chamber $C_2$"), at least a portion of the walls of which are formed by the elastic body 4.

In this embodiment, in the body 3A of the outer attachment member 3, within the thin wall portion 3w that forms the recess D, openings $A_1$ are formed on the portions where the plane 3fc and the plane 3fd are formed on the inside of the body 3A. The openings $A_1$ are each formed so as to open the first pressure-absorbing fluid chambers $C_1$ to the outside. Furthermore, as illustrated in FIG. 3, an opening $A_2$ is formed on the thin wall portion 3w at the portion where the plane 3fb is formed. The opening $A_2$ is formed so as to open the second pressure-absorbing fluid chamber $C_2$ to the outside. A plate member 30, however, is fit into the opening $A_2$. A plurality of through-holes $A_3$ are formed in the plate member 30.

In this embodiment, a membrane member 31 is provided on the attachment portion 3B of the outer attachment member 3. The membrane member 31 is, for example, formed from an elastic material such as a rubber material. In this embodiment, the membrane member 31 is provided on a holding recess 3d formed on the attachment portion 3B. As a result, in this embodiment, when the attachment portion 3B is assembled onto the body 3A of the outer attachment member 3, the membrane member 31 is housed by the plate member 30 without separating from the holding recess 3d.

Furthermore, in this embodiment, a fluid chamber recess 3e is formed on the attachment portion 3B of the outer attachment member 3. The fluid chamber recess 3e is located below the holding recess 3d and is to be connected to the holding recess 3d via a plurality of through-holes $A_4$. In this embodiment, the fluid chamber recess 3e is formed by a fluid chamber recess body $3e_1$ and an outer recess $3e_2$ formed so as to line the fluid chamber recess body $3e_1$. A diaphragm member 40 is attached to the outer recess $3e_2$. The diaphragm member 40 is, for example, formed from an elastic material such as a rubber material. By thus securing the diaphragm member 40 to the attachment portion B, a space $C_3$ having the fluid chamber recess body $3e_1$ and the diaphragm member 40 as walls is formed inside the outer attachment member 3. The space $C_3$ is filled with fluid and constitutes the auxiliary fluid chamber that can expand and contract (also referred to below as "auxiliary fluid chamber $C_3$.").

Furthermore, in this embodiment, two first circumferential grooves $3g_1$ are formed on the outer circumferential surface of the attachment portion 3B in the outer attachment member 3. One end of each of the first circumferential grooves $3g_1$ is to be connected to an introducing hole $3h_1$ in communication with the auxiliary fluid chamber $C_3$, and the other end is to be connected to a notch 3c. As illustrated in FIG. 3, the notches 3c are in communication with the openings $A_1$ formed in the body 3A when the attachment portion 3B is secured to the body 3A of the outer attachment member 3. As a result, when the outer attachment member 3 is fit onto the inside of the bracket member (not illustrated), the introducing holes $3h_1$, the first circumferential grooves $3g_1$, and the notches 3c together with the bracket member form two first restricting passages $r_1$. The two first restricting passages $r_1$ cause the pair of first pressure-absorbing fluid chambers $C_1$ disposed in the sandwiching direction to be in communication with each other. In this embodiment, the two first restricting passages $r_1$ are in communication via the auxiliary fluid chamber $C_3$, but the first restricting passages $r_1$ may instead be formed so as not to communicate via the auxiliary fluid chamber $C_3$ but rather to communicate directly via the pair of first pressure-absorbing fluid chambers $C_1$.

The channel length and channel cross-sectional area of the first restricting passages $r_1$ are set (tuned) so that the resonant frequency of the first restricting passages $r_1$ becomes a predetermined frequency. The predetermined frequency may, for example, be a frequency of idle vibration (such as a frequency between 18 Hz and 30 Hz and an amplitude of ±0.5 mm or less) or a frequency of shake vibration (such as a frequency of 14 Hz or less and an amplitude greater than ±0.5 mm) that is at a lower frequency than the idle vibration.

Figure 4:
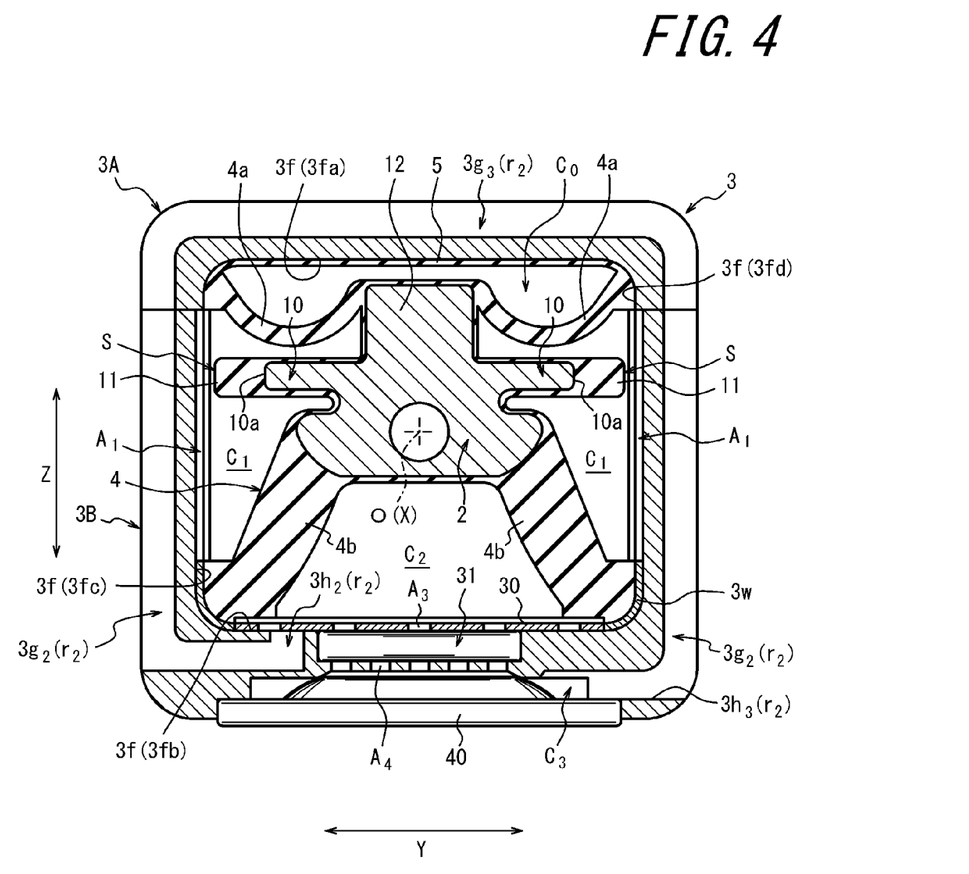
FIG. 4 is another cross-sectional diagram of the engine mount in FIG. 1 along the second restricting passage, illustrating a plane that includes the sandwiching direction and the orthogonal direction.

Furthermore, in this embodiment, as illustrated in FIG. 2, second circumferential grooves $3g_2$ and a third circumferential groove $3g_3$ that encircle the axis O when the attachment portion 3B is secured to the body 3A in the outer attachment member 3 are respectively formed on the outer circumferential surface of the attachment portion 3B and on the outer circumferential surface of the body 3A at a position offset in the axial direction X from the first circumferential grooves $3g_1$. One end of one of the two second circumferential grooves $3g_2$ formed on the attachment portion 3B is to be connected to a through-hole $3h_2$, and the other end of this second circumferential groove $3g_2$ is to be connected to one end of the third circumferential groove $3g_3$ formed on the body 3A. One end of the other one of the second circumferential grooves $3g_2$ is to be connected to the other end of the third circumferential groove $3g_3$ formed on the body 3A, and the other end of this second circumferential groove $3g_2$ is to be connected to an introducing hole $3h_3$ in communication with the auxiliary fluid chamber $C_3$. As illustrated in FIG. 4, the through-hole $3h_2$ is in communication with the second pressure-absorbing fluid chamber $C_2$ formed in the body 3A when the attachment portion 3B is secured to the body 3A of the outer attachment member 3. As a result, when the outer attachment member 3 is fit onto the inside of the bracket member (not illustrated), the through-hole $3h_2$, the second circumferential grooves $3g_2$, the third circumferential groove $3g_3$, the second circumferential grooves $3g_2$, and the introducing hole $3h_3$ together with the bracket member (not illustrated) form the second restricting passage $r_2$ that places the second pressure-absorbing fluid chamber $C_2$ in communication with the auxiliary fluid chamber $C_3$.

The channel length and channel cross-sectional area of the second restricting passage $r_2$ are set (tuned) so that the resonant frequency of the second restricting passage $r_2$ becomes a predetermined frequency.

The first pressure-absorbing fluid chambers $C_1$ are disposed at opposite sides of the inner attachment member 2. In this embodiment, the two first pressure-absorbing fluid chambers $C_1$ are disposed so as to sandwich the inner attachment member 2. The sandwiching direction Y in which the pair of first pressure-absorbing fluid chambers $C_1$ are disposed so as to sandwich the inner attachment member 2 is a direction extending along a plane orthogonal to the axial direction X (axial cross-section). In this embodiment, the sandwiching direction Y corresponds to the longitudinal direction (the direction of movement) of the vehicle. In this embodiment, the second pressure-absorbing fluid chamber $C_2$ and the auxiliary fluid chamber $C_3$ are aligned in the inner attachment member 2 in the orthogonal direction Z that is orthogonal to the axial direction X and the sandwiching direction Y. In other words, the orthogonal direction Z is another direction that extends along the plane orthogonal to the axial direction X (axial cross-section) and is orthogonal to the sandwiching direction Y. In this embodiment, the orthogonal direction Z corresponds to the vertical direction (the perpendicular direction) of the vehicle.

Furthermore, as illustrated in FIGS. 3 and 4, in this embodiment, a stopper part S that functions when a load is input in the sandwiching direction Y is provided inside each of the pair of first pressure-absorbing fluid chambers $C_1$. In this embodiment, the stopper part S includes a stopper body 10 that is provided integrally with the inner attachment member 2 and extends in the sandwiching direction Y from the inner attachment member 2 towards the outer attachment member 3. Furthermore, in this embodiment, the stopper part S includes an elastic member 11. The elastic member 11 in this embodiment is formed integrally with the elastic body 4 so as to cover the stopper body 10 entirely, but it suffices to cover at least a tip 10a of the stopper body 10.

The effects of the engine mount 1 of this embodiment are now described. In the following explanation, the engine mount 1 is configured so that the inner attachment member 2 is to be connected to the vibration receiving portion side, which is the chassis (vehicle body) side, and the outer attachment member 3 is to be connected to the vibration generating portion side, which is the engine side. Vibration along a perpendicular direction from the vibration generating portion to the vibration receiving portion is considered to be primary vibration, whereas vibration along the longitudinal direction and the transverse direction of the chassis (in this embodiment, the axial direction X) is considered to be secondary vibration.

In this embodiment, the orthogonal direction Z matches the perpendicular direction, and therefore upon input of the primary vibration, the inner attachment member 2 and the outer attachment member 3 are relatively displaced via the elastic body 4. When the second pressure-absorbing fluid chamber $C_2$ expands and contracts, and fluid flows through the second restricting passage $r_2$ between the second pressure-absorbing fluid chamber $C_2$ and the auxiliary fluid chamber $C_3$, then vibration having an equivalent frequency to the resonant frequency of the second restricting passage $r_2$ can be absorbed and attenuated. In particular, in this embodiment, the inner attachment member 2 extends along the overall length of the second pressure-absorbing fluid chamber $C_2$ in the axial direction X. Therefore, the second pressure-absorbing fluid chamber $C_2$ can greatly expand and contract along the overall length in the axial direction X.

At this time, when the two first pressure-absorbing fluid chambers $C_1$ expand and contract in conjunction, and fluid flows through the first restricting passages $r_1$ between the two first pressure-absorbing fluid chambers $C_1$ and the auxiliary fluid chamber $C_3$, then vibration having an equivalent frequency to the resonant frequency of the first restricting passages $r_2$ can be absorbed and attenuated. In particular, in this embodiment, the inner attachment member 2 extends along the overall length of the first pressure-absorbing fluid chambers $C_1$ in the axial direction X. Therefore, the first pressure-absorbing fluid chambers $C_1$ can greatly expand and contract along the overall length in the axial direction X.

When the relative displacement of the inner attachment member 2 and the outer attachment member 3 in the orthogonal direction Z is excessive, the relative displacement of the inner attachment member 2 and the outer attachment member 3 can be restricted by an auxiliary stopper part 12 provided at the upper portion of the inner attachment member 2 contacting the cylinder rubber 5 of the outer attachment member 3 (plane 3fa). In this embodiment, the auxiliary stopper part 12 is wholly covered by the first partitions 4a of the elastic body 4 and by an elastic member.

In this embodiment, the sandwiching direction Y matches the longitudinal direction, and therefore upon input of the secondary vibration, the inner attachment member 2 and the outer attachment member 3 are relatively displaced via the elastic body 4. When the first pressure-absorbing fluid chambers $C_1$ expand and contract, and fluid flows through the first restricting passages $r_1$ between the pair of first pressure-absorbing fluid chambers $C_1$ and the auxiliary fluid chamber $C_3$, then vibration having an equivalent frequency to the resonant frequency of the first restricting passages $r_1$ can be absorbed and attenuated. In this case as well, since the inner attachment member 2 extends along the overall length of the first pressure-absorbing fluid chambers $C_1$ in the axial direction X as described above, the first pressure-absorbing fluid chambers $C_1$ can greatly expand and contract along the overall length in the axial direction X.

When the relative displacement of the inner attachment member 2 and the outer attachment member 3 in the sandwiching direction Y is excessive, the relative displacement of the inner attachment member 2 and the outer attachment member 3 can be restricted by the stopper parts S disposed inside the first pressure-absorbing fluid chambers $C_1$ contacting the walls of the first pressure-absorbing fluid chambers $C_1$ or the bracket member (not illustrated). In this way, the elastic body 4 can be prevented from deforming excessively, thereby making it easy to maintain the performance of the elastic body 4 reliably for an extended period of time.

Figure 5:
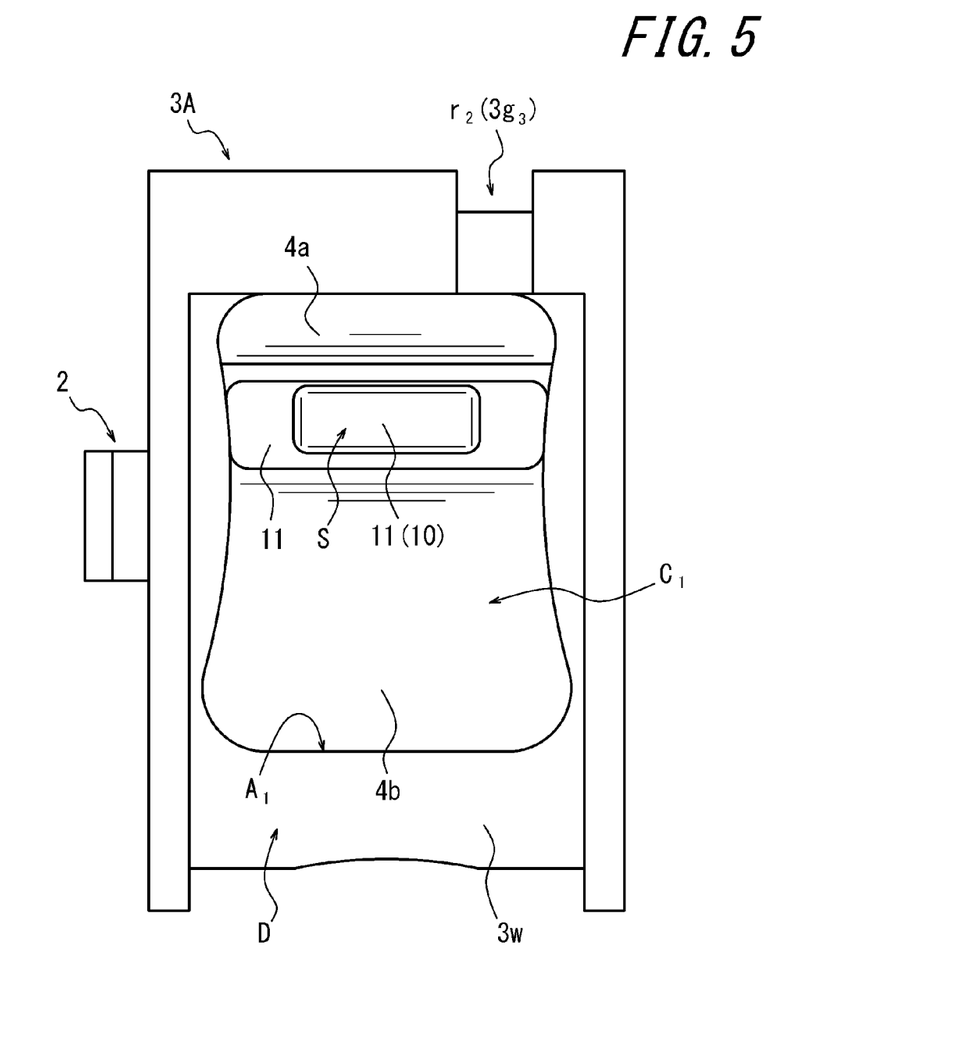
FIG. 5 is a side view illustrating a portion of the engine mount from the side surface, with the portion constituting the restricting passages being partially removed from the engine mount in FIG. 1.

According to the engine mount 1 of this embodiment, an anti-vibration effect is achieved with respect to vibration from at least two directions, i.e. the vertical direction and either the longitudinal direction or the axial direction. Moreover, disposing the stopper part S, which acts with respect to the relative displacement in the sandwiching direction Y, inside the first pressure-absorbing fluid chamber $C_1$ guarantees a larger space for the first pressure-absorbing fluid chambers $C_1$ by greatly reducing the proportion in the orthogonal direction Z occupied by the space $C_0$ between the plane 3fa of the outer attachment member 3 and the first partitions 4a of the elastic body 4 (see the first pressure-absorbing fluid chambers $C_1$ in FIGS. 3 and 4 and the openings $A_1$ in FIG. 5). In this case, when the first pressure-absorbing fluid chambers $C_1$ expand and contract, the amount of fluid supplied and drained from the first pressure-absorbing fluid chambers $C_1$ can be guaranteed to be large. Therefore, anti-vibration properties can be obtained over a larger range than in a conventional anti-vibration device in which the stopper part is disposed on the outside of the elastic body 4.

Furthermore, the great reduction in the proportion that the space $C_0$ occupies in the orthogonal direction Z allows inadvertent contact between the first partition 4a and the stopper part S to be avoided, and even if such contact is made, the stopper part S does not push down from above, but rather pushes up from below, thereby reducing the load on the first partition 4a. Moreover, as in a conventional device, the relative displacement of the inner attachment member 2 and the outer attachment member 3 can be restricted by the stopper part S disposed inside the first pressure-absorbing fluid chamber $C_1$.

In this way, according to the engine mount 1 of this embodiment, the amount of elastic deformation of the elastic body 4 can be kept down to a desired value while avoiding inadvertent contact between the stopper part S and the elastic body 4. Hence, according to the engine mount 1 of this embodiment, an anti-vibration device that has excellent durability while reducing the amount of elastic deformation of the elastic body 4 can be provided.

When the stopper part S (stopper body 10) is provided integrally with the inner attachment member 2 and extends from the inner attachment member 2 towards the outer attachment member 3 as in the engine mount 1 of this embodiment, the displacement amount of the inner attachment member 2 is exactly the displacement amount of the stopper part S, making it easy to adjust the amount of elastic deformation of the elastic body 4.

Furthermore, when the stopper part S includes the elastic member 11 at least on the tip 10a of the stopper body 10 as in the engine mount 1 of this embodiment, the collision shock when the stopper part S functions is reduced, thereby allowing desired anti-vibration properties to be obtained stably.

The case described above is only one embodiment of this disclosure, and a variety of modifications may be made within the scope of the appended claims. For example, the anti-vibration device of this description is not limited to being an engine mount and may also be used as a mount for a generator installed in construction machinery or as a mount for a machine installed in a location such as a factory.

Furthermore, the anti-vibration device of this disclosure is not limited to a compression type anti-vibration device in which the second pressure-absorbing fluid chamber $C_2$ is positioned above the auxiliary fluid chamber $C_3$ and may also be applied to a suspension type anti-vibration device attached so that the second pressure-absorbing fluid chamber $C_2$ is positioned below the auxiliary fluid chamber $C_3$. The appearance of the inner attachment member 2 and the outer attachment member 3 is not limited to the axial cross-section thereof being a rectangular shape, as in this embodiment. The axial cross-section may be a variety of shapes, such as an ellipse, an exact circle, or the like.

INDUSTRIAL APPLICABILITY

As described above, this disclosure may be applied to an anti-vibration device that absorbs vibration from two directions, i.e. the orthogonal direction and either the axial direction or the sandwiching direction.

REFERENCE SIGNS LIST

1 Engine mount
2 Inner attachment member
3 Outer attachment member
4 Elastic body
10 Stopper part
11 Elastic member
$C_1$ First pressure-absorbing fluid chamber
$C_2$ Second pressure-absorbing fluid chamber
$C_3$ Auxiliary fluid chamber
O Axis
$r_1$ First restricting passage
$r_2$ Second restricting passage
S Stopper part
X Axial direction
Y Sandwiching direction
Z Orthogonal direction

The invention claimed is:

1. An anti-vibration device comprising:
an inner attachment member that is to be connected to one of a vibration generating portion and a vibration receiving portion;
an outer attachment member that surrounds the inner attachment member around an axis of the inner attachment member and is to be connected to the other one of the vibration generating portion and the vibration receiving portion;
an elastic body that is disposed between the inner attachment member and the outer attachment member and allows relative displacement between the inner attachment member and the outer attachment member by elastic deformation;
a pair of first pressure-absorbing fluid chambers, at least a portion of walls thereof being formed by the elastic body, that are in communication with each other via a first restricting passage and are filled with a fluid; and
a second pressure-absorbing fluid chamber, at least a portion of walls thereof being formed by the elastic body, that is in communication with a fluid-filled auxiliary fluid chamber via a second restricting passage and is filled with a fluid, wherein
the first pressure-absorbing fluid chambers are disposed at opposite sides of the inner attachment member,
the second pressure-absorbing fluid chamber is aligned with the inner attachment member in an orthogonal direction that is orthogonal to a direction along the axis of the inner attachment and to a sandwiching direction in which the first pressure-absorbing fluid chambers are disposed so as to sandwich the inner attachment member,
the second pressure-absorbing fluid chamber is positioned between the axis of the inner attachment and the auxiliary fluid chamber in the orthogonal direction, and
a stopper part that restricts the relative displacement between the inner attachment member and the outer attachment member upon a load being input in the sandwiching direction is provided inside at least one of the pair of first pressure-absorbing fluid chambers.

2. The anti-vibration device of claim 1, wherein the stopper part is provided integrally with the inner attachment member and extends from the inner attachment member towards the outer attachment member.

3. The anti-vibration device of claim 2, wherein the stopper part includes an elastic member at least at a tip of the stopper part.

4. The anti-vibration device of claim 1, wherein the stopper part includes an elastic member at least at a tip of the stopper part.

5. The anti-vibration device of claim 1, wherein a space chamber is formed between the outer attached member and the elastic body, and wherein the space chamber is disposed on the opposite side of the second pressure-absorbing fluid chamber from the axis of the inner attachment member in the orthogonal direction.

6. The anti-vibration device of claim 5, wherein an auxiliary stopper is provided at the portion of the inner attachment member, such that the auxiliary stopper extends in the orthogonal direction and is spaced apart from the outer attachment member by the space chamber.

7. The anti-vibration device of claim 1,
wherein the first restricting passage includes two first circumferential grooves which are formed on the outer circumferential surface of the outer attachment member, and
wherein one end of each of the first circumferential grooves is connected to a first introducing hole in communication with the auxiliary fluid chamber, and the other end of each of the first circumferential grooves is connected to a notch in communication with each of the pair of the first pressure-absorbing chambers.

8. The anti-vibration device of claim 1,
wherein the second restricting passage includes a first circumferential groove, a second circumferential groove and a third circumferential groove,
wherein the first and second circumferential grooves each extend in the orthogonal direction on the outer surface of the outer attachment member,
wherein the third circumferential groove extends in the sandwiching direction on the outer surface of the outer attachment member,
wherein the auxiliary fluid chamber is disposed on one side in the orthogonal direction from the axis of the inner attachment member, and the third circumferential groove is disposed on the other side in the orthogonal direction from the axis of the inner attachment member,
wherein one end of the first circumferential grooves is connected to a through-hole in communication with the second pressure-absorbing chamber, and the other end of the first circumferential grooves is connected to one of the third circumferential groove, and
wherein one end of the second circumferential grooves is connected to the other end of the third circumferential groove, and the other end of the second circumferential groove is connected to a second introducing hole in communication with the auxiliary fluid chamber.

9. The anti-vibration device of claim 1,
wherein the first restricting passage includes two first circumferential grooves which are formed on the outer circumferential surface of the outer attachment member,
wherein one end of each of the first circumferential grooves is connected to a first introducing hole in communication with the auxiliary fluid chamber, and the other end of each of the first circumferential grooves is connected to a notch in communication with each of the pair of the first pressure-absorbing chambers,
wherein the second restricting passage includes two second circumferential grooves and third circumferential groove,
wherein the two second circumferential grooves extend in the orthogonal direction on the outer surface of the outer attachment member,
wherein the third circumferential groove extend in the sandwiching direction on the outer surface of the outer attachment member,
wherein the auxiliary fluid chamber is disposed on one side in the orthogonal direction from the axis of the inner attachment member, and the third circumferential groove is disposed on the other side in the orthogonal direction from the axis of the inner attachment member,
wherein one end of one of the two second circumferential grooves is connected to a through-hole in communication with the second pressure-absorbing chamber, and the other end of the one of the two second circumferential grooves is connected to one of the third circumferential groove,
wherein one end of the other of the two second circumferential grooves is connected to the other end of the third circumferential groove, and the other end of the other of the two second circumferential grooves is connected to a second introducing hole in communication with the auxiliary fluid chamber, and
wherein the first restricting passage and the second restricting passage are connected to each other only via the auxiliary fluid chamber.

10. The anti-vibration device of claim 1,
wherein the first restricting passage includes two first circumferential grooves which are formed on the outer circumferential surface of the outer attachment member,
wherein one end of each of the first circumferential grooves is connected to a first introducing hole in communication with the auxiliary fluid chamber, and the other end of each of the first circumferential grooves is connected to a notch in communication with each of the pair of the first pressure-absorbing chambers,
wherein the second restricting passage includes two second circumferential grooves and third circumferential groove,
wherein the two second circumferential grooves extend in the orthogonal direction on the outer surface of the outer attachment member,
wherein the third circumferential groove extend in the sandwiching direction on the outer surface of the outer attachment member,
wherein the auxiliary fluid chamber is disposed on one side in the orthogonal direction from the axis of the inner attachment member, and the third circumferential groove is disposed on the other side in the orthogonal direction from the axis of the inner attachment member,
wherein one end of one of the two second circumferential grooves is connected to a through-hole in communication with the second pressure-absorbing chamber, and the other end of the one of the two second circumferential grooves is connected to one of the third circumferential groove,
wherein one end of the other of the two second circumferential grooves is connected to the other end of the third circumferential groove, and the other end of the other of the two second circumferential grooves is connected to a second introducing hole in communication with the auxiliary fluid chamber,
wherein, in a sectional view that is perpendicular to the axis of the inner attachment member and that includes the first restricting passage, the stopper part is aligned with each of the notches in the orthogonal direction, and
wherein, in a sectional view that is perpendicular to the axis of the inner attachment member and that includes the second restricting passage, the stopper part is aligned with an inner surface of the outer attachment member in the orthogonal direction.

* * * * *